United States Patent [19]

Miller et al.

[11] 4,033,643

[45] July 5, 1977

[54] BALL BEARING ASSEMBLY WITH DUST SHIELD

[75] Inventors: Donald A. Miller, Sterling, Ill.; William O. Setele, Independence, Ohio

[73] Assignee: Kendale Industries, Inc., Valley View, Ohio

[22] Filed: June 25, 1976

[21] Appl. No.: 700,016

[52] U.S. Cl. ............................................. 308/187.2
[51] Int. Cl.² ............................................. F16C 33/80
[58] Field of Search ............. 308/20, 187.1, 187.2, 308/194, 196; 277/95, 94, 65

[56] References Cited
UNITED STATES PATENTS

| | | |
|---|---|---|
| 2,584,227 | 2/1952 | Potter ............................ 308/187.2 |
| 2,654,644 | 10/1953 | Sutowski ........................ 308/187.2 |
| 3,420,590 | 1/1969 | Bilocq .............................. 308/20 X |
| 3,680,933 | 8/1972 | Walker ............................ 308/187.1 |
| 3,841,721 | 10/1974 | Coutant et al. ...................... 308/20 |

*Primary Examiner*—Joseph F. Peters, Jr.
*Assistant Examiner*—Gene A. Church
*Attorney, Agent, or Firm*—Woodling, Krost, Granger & Rust

[57] ABSTRACT

A ball bearing assembly having a dust shield for protecting the inner portions of the assembly, the shield being non-rotatively carried by the inner race member and being free of frictional contact with other parts of the assembly, the shield being preferably composed of material selected from the group consisting of polyethylene, nylon and teflon.

5 Claims, 2 Drawing Figures

BALL BEARING ASSEMBLY WITH DUST SHIELD

This is an abstract only of the specific illustration of the invention given by way of example, and is not to be used in the interpretation of the claims nor as a limitation on the scope of the invention.

An object of our invention is an improved shield for a ball bearing assembly.

Another object is the provision for more efficiently protecting the inner parts from dust and the like.

Figure 1:
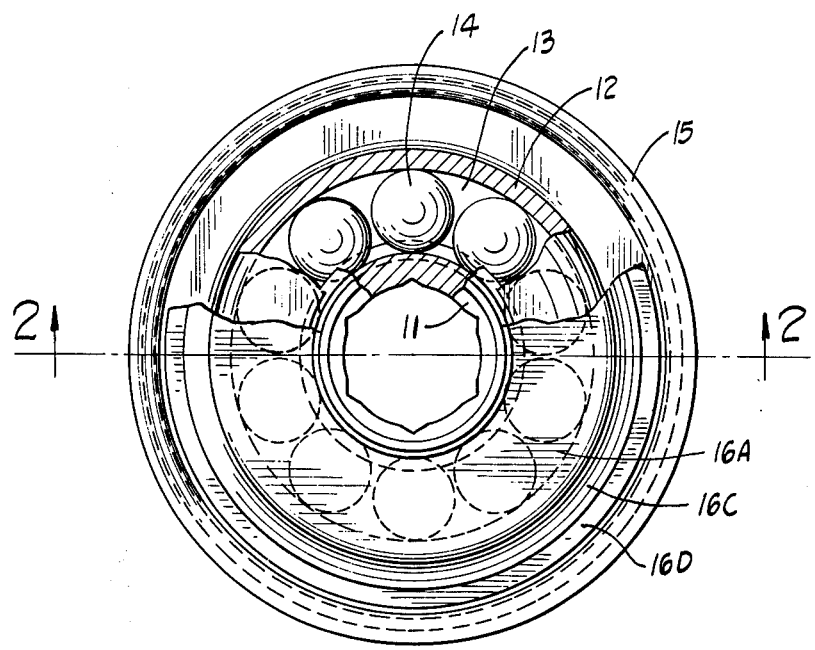
Figure 2:
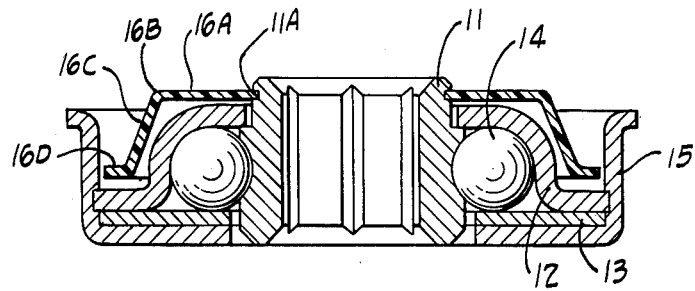

Other objects and a fuller understanding of this invention may be had by referring to the following description and claims, taken in conjunction with the accompanying drawings in which:

FIG. 1 is a plan of our improved bearing assembly with shield portions being cut away in sections; and FIG. 2 is a cross-sectional view of the bearing assembly shown in FIG. 1 looking in the direction of the arrows 2—2.

Bearing assemblies such as the one herein disclosed are of the type which fit into the open end of a tube or the like which is used in a roller conveyor. One of these bearing assemblies is inserted and secured in the opposite ends of a tube of the plurality of tubes of the conveyor.

Our bearing assembly has an inner race member 11 which is splined to receive a shaft or stub shaft in the usual menner whereby the inner race member is not-rotatively secured to such a shaft extending axially thereof.

An outer race member 12 formed of a stamping or the like, is disposed circumferentially outward of the inner race member but clears the inner race member so as to avoid frictional inter-engagement therewith.

A plurality of balls 14, in this case 10 in number, are arranged in a circle and interposed between the inner race member and outer race member in the usual manner whereby there is rolling inter-engagement of the inner and outer race members with the balls.

The inner and outer race members, with the balls interposed therebetween, are mounted within an outer housing or shell 15, also made of a stamping. The outer peripheral wall of the housing 15 is adapted to snugly fit within the open end of the tube. The housing is cup-shaped so as to have an axially extending outer wall and a radially extending wall which projects from the outer wall portion toward the inner race member. Interposed between the outer race member and the radially extending portion of the housing is a spacer or annular disc 13.

The several parts described are made of metal and preferably of steel. These parts are arranged and held as illustrated in the drawing. The outer race member, the housing 15 and the spacer 13 are movable together as a unit relative to the inner race member in the usual manner.

To protect the parts of the assembly within the housing 15, we provide a dust shield. This shield protects against dust, dirt and other foreign material and for purpose of convenience and terminology is referred to as a dust shield.

The dust shield is a relatively thin cup-shaped member, preferably composed of material selected from the group consisting of polyethylene, nylon and teflon. It has a strength and rigidity to be self-sustaining in the position shown, and yet has a degree of flexible yieldability required for mounting to the assembly.

The inner race member 11 adjacent the one axial end thereof has an annular groove 11A formed therein as illustrated. The shield has a flat outer portion 16A which extends radially of the assembly. The inner circumferential edge portion of this flat portion 16A fits within this annular groove 11A and snugly inter-engages with the inner race member within the walls of this groove. The shield is bent or angled at location 16B so as to extend axially and radially from the portion 16A to provide the inclined portion 16C. The free end of the inclined portion 16C has radially extending flange portion 16D as illustrated.

It is to be noted that the shield at all points clears the outer race member 12 and clears the housing 15. The flange portion 16D is slightly spaced from the inner wall of the housing 15 to provide this clearance. Also the inclined portion 16C is slightly spaced from the outer wall of the outer race member 12 to provide this clearance. The flat portion 16A of the shield is slightly spaced from the outer race member 12 to provide the required clearance.

By reason of the required degree of flexible yieldability of the polyethylene, nylon or teflon shield, the shield can be force-pressed against the one axial end of the inner race member so as to press the shield down into the position shown whereby the inner peripheral edge portion of the shield snaps into and enters the groove of 11A. By reason of the character of the shield, it is self-supporting and sustains itself in the position shown and yet has this capability of being mounted in the groove of the inner race member.

It is to be observed that the shield is non-rotatively mounted to the inner race member so that there is no relative movement between the shield and inner race member. However, by means of the clearances shown and described, the parts made up of the outer race member, the housing, and the spacer can rotatively move without frictional inter-engagement with the shield. This provides a good free-wheeling bearing assembly and the same time provides maximum protection for the inner parts of the assembly.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a bearing assembly for a roller conveyor, the assembly including an outer housing adapted to engage in the open end portion of a conveyor tube for providing bearing support for the tube, an outer race member mounted to and within the said housing concentrically thereof, an inner race member concentrically in spaced relationship to said outer race member, said inner race member having an annular groove formed in its outer circumferential surface thereof adjacent a first axial end thereof away from said outer race member, and a plurality of ball bearings arranged in a circle between the inner and outer race members to provide bearing inter-engagement therebetween, the improvement of a cup-shaped dust shield of material having the strength and rigidity to be self-sustaining in mounted position and having a degree of flexible yieldability required for mounting to the assembly in the position herein claimed, said material being selected from the group consisting of polyethylene, nylon and Teflon, said dust shield having an outer portion disposed adjacent said first axial end of the assembly, said outer portion having an inner edge portion disposed in said annular groove in the inner race member and firmly held therein to support the shield in position, said shield having an axially and radially portion extending at an angle from said outer portion and spaced radially outward of said outer race member to clear the same, said shield having a circumferential outer edge portion adjoining the innermost portion of the said shield extending away from said outer race member and spaced from said housing to clear the same, whereby said shield is fixed to said inner race member and free of frictional contact with said outer race member sand housing, said shield being sufficiently rigid to be self sustaining for support in the described position and being sufficiently resiliently yieldable to permit the shield to be pressed upon said inner race member and for said inner edge portion of the shield to clear the inner race member and to enter said annular groove.

2. The improvement claimed in claim 1 and in which said shield is relatively thin as compared with the thickness of said outer race member and is of a ridigity to maintain clearance between the shield and outer race member and clearance between the shield and the outer housing, and is held in said position by the firmness of the inter-fit of the said inner edge portion of the shield in said annular groove in said inner race member.

3. The improvement claimed in claim 1 and in which said shield has a circumferential radially extending flange at the axially inner end of the shield extending toward, but not contacting, the inner wall of the housing to provide maximum coverage of the outer race member without frictional inter-engagement with said housing.

4. The improvement claimed in claim 1 and in which the shield extends along, without contacting, the portion of the outer race member located adjacent said one axial end of the assembly to protect the same, and the shield extends along, without contacting, the portion of the outer race member located radially outward of said balls to protect the same.

5. The improvement claimed in claim 1 and in which said shield has frictional inter-engagement solely with said inner race member and is free of all other parts of the assembly, and is supported in such position solely by its inter-engagement with the inner race member.

* * * * *